(12) United States Patent
Gaskill et al.

(10) Patent No.: US 7,367,261 B2
(45) Date of Patent: ***May 6, 2008

(54) SECTION DIVIDER ENSEMBLE FOR ROLLER GRILL FOR COOKING HUMAN FOOD

(75) Inventors: Timothy T. Gaskill, Edwardsville, IL (US); Michael Lee Huegerich, St. Louis, MO (US)

(73) Assignee: Star Manufacuring International Inc., St. Louis, MO (US)

( * ) Notice: Subject to any disclaimer, the term of this patent is extended or adjusted under 35 U.S.C. 154(b) by 1199 days.

This patent is subject to a terminal disclaimer.

(21) Appl. No.: 10/284,609

(22) Filed: Oct. 31, 2002

(65) Prior Publication Data

US 2004/0083902 A1 May 6, 2004

(51) Int. Cl.
*A47J 37/06* (2006.01)
(52) U.S. Cl. ............... 99/339; 99/393; 99/423; 99/441; 99/443 R; 99/448
(58) Field of Classification Search ............ 99/339, 99/393, 402, 422, 423, 441, 426, 448, 449, 99/443 R, 443 C; 220/529, 533, 543, 544, 220/546; 193/35 R, 37, 35 C, 35 MD; 198/336.1
See application file for complete search history.

(56) References Cited

U.S. PATENT DOCUMENTS

| | | | |
|---|---|---|---|
| 2,185,979 A * | 1/1940 | Dumas | 99/423 |
| 2,253,434 A | 8/1941 | Kernick | 53/5 |
| 2,290,572 A | 7/1942 | Rakov | 126/339 |
| 2,604,842 A * | 7/1952 | Dolce | 99/423 |
| 2,697,395 A | 12/1954 | Steriss | 99/423 |
| 2,905,076 A | 9/1959 | Del Francia | 99/443 |
| 3,298,303 A * | 1/1967 | Waller | 99/423 |
| 3,472,155 A | 10/1969 | Bardeau et al. | 99/423 |
| 3,692,351 A | 9/1972 | Christopher et al. | 296/23 R |
| 3,756,219 A | 9/1973 | Snyder et al. | 126/191 |
| 3,981,233 A | 9/1976 | Nugarus | 99/422 |
| 4,165,688 A * | 8/1979 | Leanna et al. | 101/207 |
| 4,370,920 A | 2/1983 | Henriques et al. | 99/339 |
| 4,406,861 A | 9/1983 | Beauvais et al. | 422/113 |
| 4,516,485 A | 5/1985 | Miller | 99/339 |
| 4,817,585 A | 4/1989 | Craver | 126/200 |
| 5,035,332 A * | 7/1991 | Stravitz | 211/40 |
| 5,458,051 A | 10/1995 | Alden et al. | 99/349 |
| 5,549,040 A | 8/1996 | Naramura | 99/349 |
| 5,722,315 A | 3/1998 | Naramura | 9/349 |
| 5,782,171 A | 7/1998 | Crain et al. | 99/408 |
| 6,166,353 A | 12/2000 | Senneville et al. | 219/385 |
| 6,248,010 B1 * | 6/2001 | Sirgo et al. | 452/5 |

(Continued)

OTHER PUBLICATIONS

APW/Wyott—Hot Rod Rolling Grills; Aug., 1995.

(Continued)

*Primary Examiner*—Reginald L. Alexander
(74) *Attorney, Agent, or Firm*—Polster, Lieder, Woodruff & Lucchesi

(57) ABSTRACT

A roller grill for cooking human food is disclosed which comprises a housing having a plurality of tubular cooking members rotatably mounted within the housing and a divider ensemble shaped to be positioned on the tubular cooking members for sectioning the tubular cooking members into a first cooking area and a second cooking area.

26 Claims, 9 Drawing Sheets

U.S. PATENT DOCUMENTS

| | | | |
|---|---|---|---|
| 6,393,971 B1 | 5/2002 | Hunot et al. | 99/341 |
| 6,450,325 B1* | 9/2002 | Devnani | 198/788 |
| 7,097,052 B2* | 8/2006 | Lau | 211/184 |
| 2003/0197001 A1* | 10/2003 | Grohs | 219/450.1 |

OTHER PUBLICATIONS

Page from a trade magazine (publication date unknown, but product existed prior to Oct. 9, 1997), showing APW/Wyott Roller Grill.

Connolly Roll-A-Grill (publication date unknown, but products existed prior to Oct. 9, 1997).

Gold Medal Roller Grill Assemblies (publication date unknown, but products existed prior to Oct. 9, 1997).

Roundup Hot Dog Corrals (publication date unknown, products existed prior to Oct. 9, 1997).

Trade magazine advertisements showing Gold Medal Products Roller Grill, Berks Packing Company's Roller Grill, and other products (publication date unknown, products existed prior to Oct. 9, 1997).

Watlow Catalog pages (products such as shown existed prior to Oct. 9, 1997).

Fluoroplastics, published in *Modern Plastics Encyclopedia*, 1981-1982, discussing polytetrafluoroethylene (PTFE).

Website Information of Whitford, showing prior art information concerning PTFE (polytetrafluoroethylene), date unknown.

Attached Photographs Numbered 1 through 22, date unknown.

\* cited by examiner

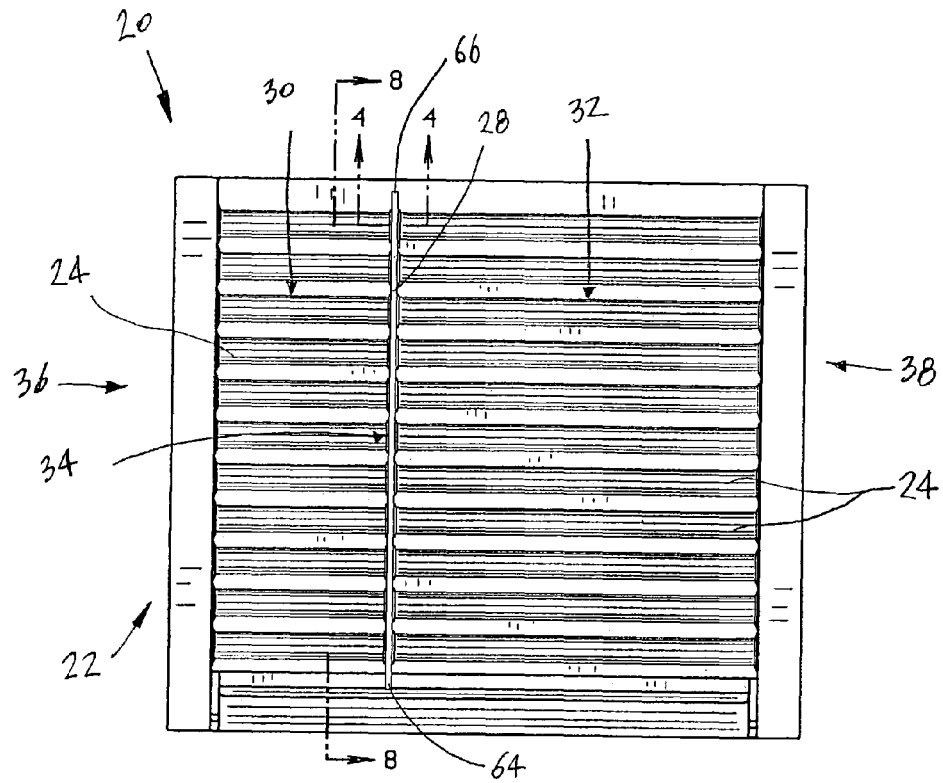
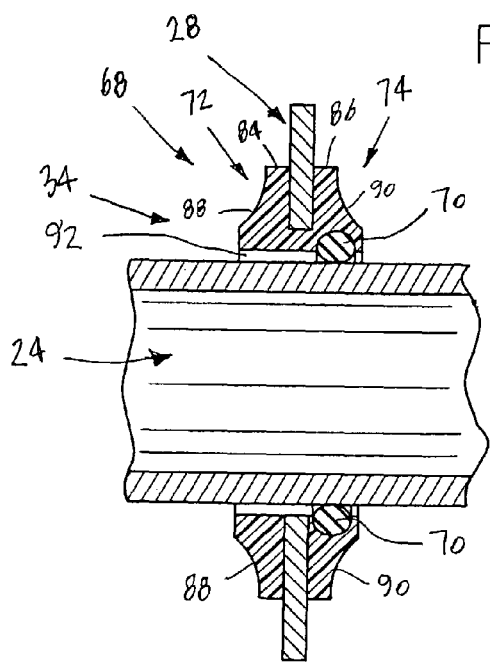
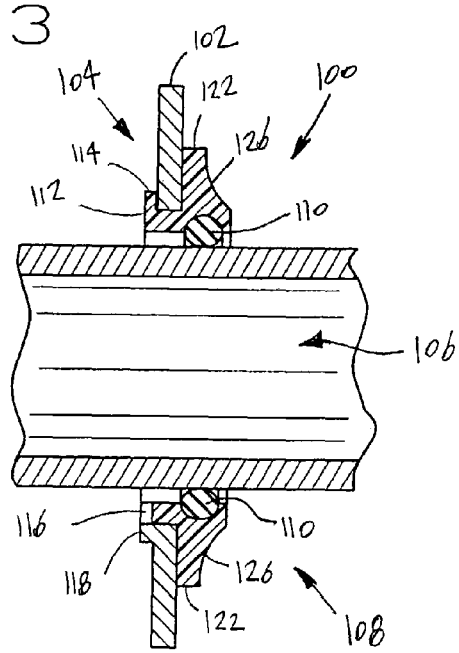

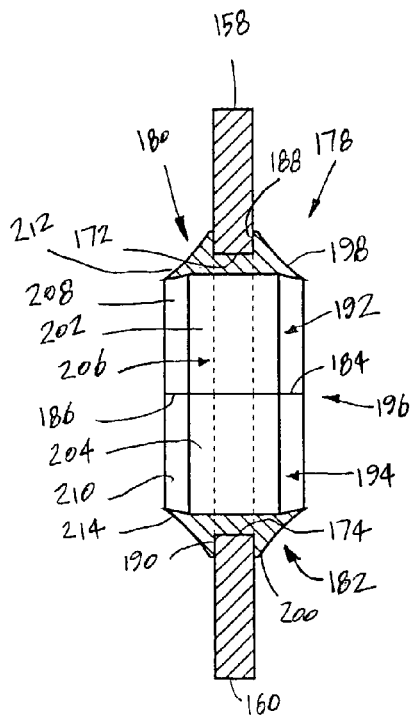
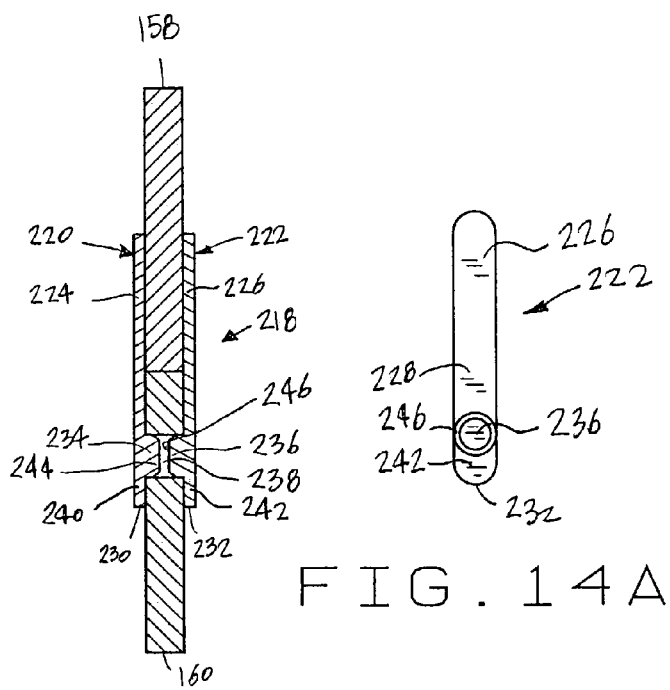
FIG. 13    FIG. 14    FIG. 14A
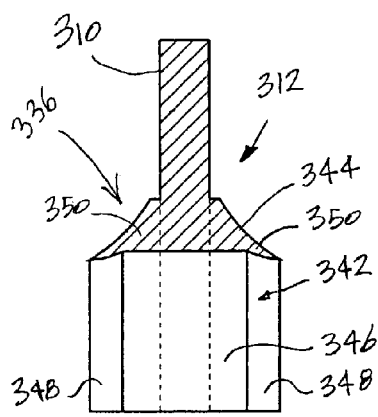
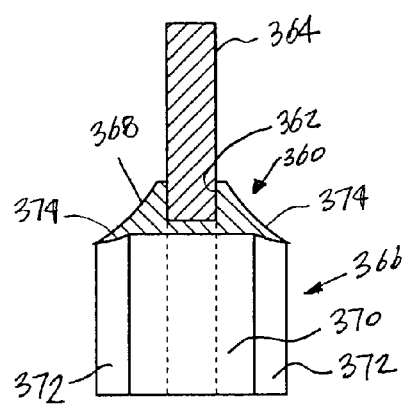
FIG. 17    FIG. 17A

SECTION DIVIDER ENSEMBLE FOR ROLLER GRILL FOR COOKING HUMAN FOOD

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates generally to a roller grill for cooking human food having a section divider ensemble.

Roller food grill assemblies are used in commercial establishments to quickly cook food products for customers. Such roller food grill assemblies typically have rotatable roller tubes for heating and cooking food. Roller tube cooking is especially adaptable to heating and cooking products that have an elongated shape, such as hot dogs, brats, and wieners. In this manner, the food product is placed on the heating surface of the roller tubes. As the roller tubes rotate, the food product is in constant contact with the roller tubes and the food product is evenly cooked and heated. However, due to the construction of these roller food grill assemblies it is difficult to cook food products having varying or differing lengths. Further, it may not be desirable to cook different food products on the same surface due to juices or tastes cooked from one product being absorbed onto another dissimilar product. For example, a hot dog may end up tasting like a brat. Additionally, it may be desirable to cook a relatively short food product, such as an egg roll, while at the same time it would be desirable to cook a relatively long food product, such as a foot long hotdog. In such situation the known food grill assemblies are not capable of being adjusted to compensate for food products having different lengths.

The present invention is designed to obviate and overcome many of the disadvantages and shortcomings experienced with roller food grill assemblies discussed hereinbefore and with other food grill assemblies used in the past, and to provide a food grill assembly which can be easily utilized to cook foods having differing or varying lengths. Moreover, the food grill assembly of the present invention is more advantageous than the food grill assemblies previously used in that it is capable of separately cooking foods that have different lengths. Further, the present food grill assembly seals out or prevents against the transfer of juices or tastes from one food product to another dissimilar food product.

SUMMARY OF THE INVENTION

In one form of the present invention, a roller grill for cooking human food comprises a housing having a plurality of tubular cooking members rotatably mounted within the housing, and a divider ensemble shaped to be positioned on the tubular cooking members for sectioning the tubular cooking members into a first cooking area and a second cooking area.

In another form of the present invention, a divider ensemble for a roller grill assembly for cooking a first food product having a first length and a second food product having a second length, the roller grill assembly comprising a plurality of rotatable tubular cooking members, the divider ensemble comprises a wall member having a plurality of openings with each of the openings having a bearing assembly shaped to receive one of the tubular cooking members.

Features obtained by the invention as covered by one or more of the claims include one or more of the following: to provide an improved roller grill for cooking human food with the roller grill having a section divider ensemble; to provide a roller grill assembly for cooking human food having a section divider ensemble which is of simple construction and design and which can be easily employed with highly reliable results; to provide a roller grill assembly that is capable of cooking foods that have different lengths; to provide a roller grill assembly that is capable of preventing the transfer of juices or tastes from one food product to another food product when both of the products are being cooked at the same time; to provide a roller grill assembly in which foods having the same length may be cooked on one section of the roller grill assembly and foods having a different length may be cooked on another section of the roller grill assembly; to provide a roller grill assembly for cooking human food having a section divider ensemble which is removable; to provide a roller grill assembly for cooking human food having a number of divider ensembles for partitioning the roller grill assembly into various cooking areas; to provide a roller grill assembly for cooking human food with a section divide ensemble that is adjustable relative to the roller grill; to provide a divider ensemble for a roller grill assembly that can be easily installed; and to provide a divider ensemble for a roller grill assembly that can be easily removed from the roller grill assembly.

These and other objects and advantages of the present invention will become apparent after considering the following detailed specification in conjunction with the accompanying drawings.

BRIEF DESCRIPTION OF THE DRAWINGS

The objects of the invention are achieved as set forth in the illustrative embodiments shown in the drawings which form a part of the specification. In the drawings:

FIG. 3 is a top plan view of the assembly of FIG. 1 showing the divider;

FIG. 4 is a section of part of the assembly of FIG. 1 showing a roller tube extending through a sealing member mounted about a hole in the divider;

FIG. 6 is a view of a roller tube extending through an alternate sealing member assembly mounted about a hole in the divider;

FIG. 13 is a section of the modified divider of FIGS. 10-12, taken on the line 13-13 of FIG. 11;

FIG. 14 is a section of the modified divider of FIGS. 10-12, taken on the line 14-14 of FIG. 11, and depicting an enlarged view of the latching ensemble;

FIG. 14A is a side elevation of an isolated latching tong of the latching ensemble;

FIG. 17 is a section of the divider of FIGS. 15-16, taken on the line 17-17 of FIG. 16, but not showing the lower right end of the divider as seen in FIG. 16;

FIG. 17A is a section of a modification of the divider of FIG. 17, wherein the partition wall of the divider is a separate component from the bearing/sealing member;

Corresponding reference characters indicate corresponding parts throughout the several views of the drawings.

DETAILED DESCRIPTION OF INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. As various changes could be made in the above constructions without departing from the scope of the invention, it is intended that all matter contained in the following description or shown in the accompanying drawings shall be interpreted as illustrative and not in a limiting sense.

Figure 1:
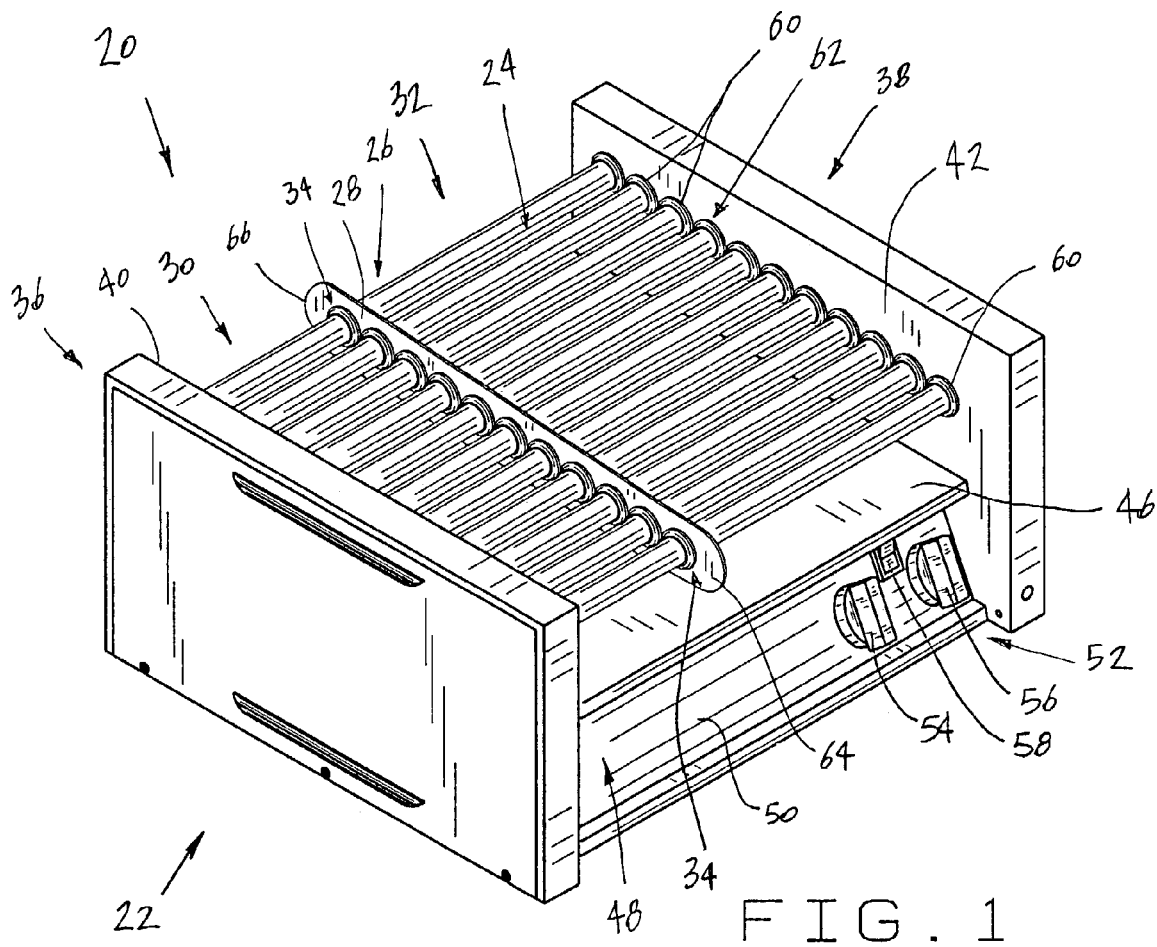
FIG. 1 is an orthogonal projection of a roller grill assembly having a section divider constructed according to the present invention.
Figure 2:
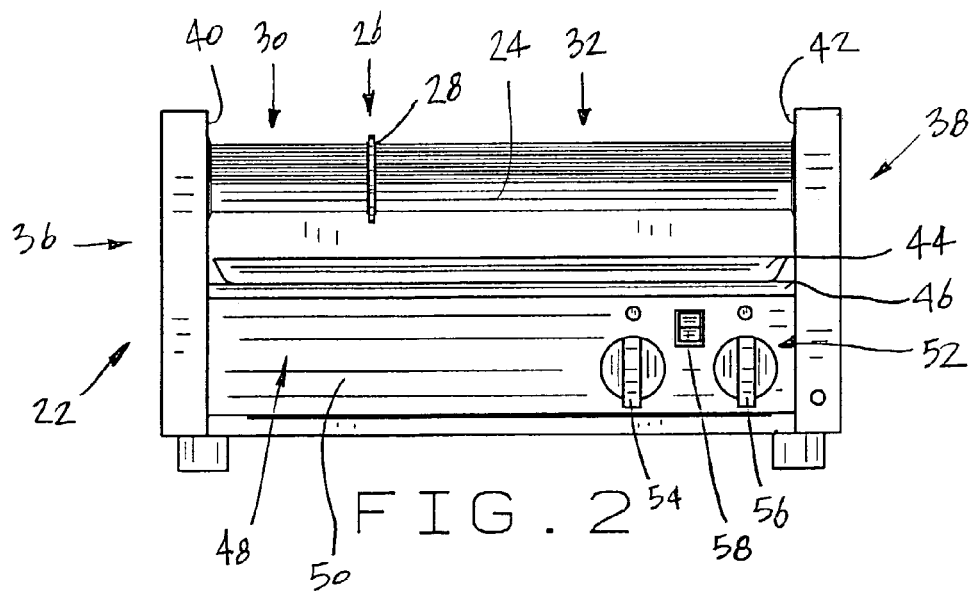
FIG. 2 is a front elevation of the divider for the roller grill assembly of FIG. 1.

With reference now to FIGS. 1-3, a roller grill assembly for cooking human food is generally designated by numeral 20. The assembly 20 generally comprises a main housing 22, upon which are mounted a plurality of rotatable tubular cooking members 24 which are adapted to being heated, as will be explained fully herein. The assembly 20 further comprises a divider ensemble 26 comprising a divider partition wall member 28 for separating the cooking tubes 24 into two cooking areas or sections 30 and 32. The divider ensemble 26 also comprises roller tube bearing/sealing sub-assemblies 34 for providing a seal of the partition wall 28 about the tubes 24. The section divider ensemble 26 can be used with roller tube assemblies of various types wherein the tubes rotate relative to a housing to which they are mounted. The housing 22 can vary in size and configuration. A detailed example of such a roller grill assembly is shown in U.S. Pat. No. 6,393,971, which is assigned to the assignee of this application, and said patent is incorporated herein by this reference. The various manners or constructions in which the cooking tubes 24 are rotated or operated are also described in detail in such referenced patent.

The housing 22 comprises two generally rectangular side support frames 36 and 38. Each of the side support frames 36 and 38 are fabricated from a rigid material such as stainless steel and can be stamped so that they each have an interior sidewall 40 and 42, respectively. A separate grease drip tray 44 is provided which rests on a floor section 46 beneath the roller tubes 24 to catch grease and fluids dripping there from. Towards its front, the housing 22 comprises a control panel 48 that has a middle wall section 50 that extends rearwardly at an angle of about 15° to 20°. A control assembly 52 is positioned on the control panel 48 and comprises a pair of temperature control knobs 54 and 56, which are rotatable for selectively controlling the temperature of the roller tubes 24. A power switch 58 is also mounted to the control panel 48 and is used to power the roller grill 20. Each of the frame sidewalls 36 and 38 has a plurality of holes 60 for mounting the rotatable cooking tubes 24 into tube sealing sub-assemblies 62. The construction and composition of the tube sealing sub-assemblies 62 will be described in more detail herein. Further, the partition wall member 28 of the divider ensemble 26 may be constructed of or formed from metal such as stainless steel, or other suitable material such as polytetrafluoroethylene. The partition 28 is elongated and has a front or distal end 64, and a rear or proximal end 66, both of which are illustrated as having a generally semicircular shape. The ends 64 and 66 can have other shapes, but curved ends are preferred.

Figure 5:
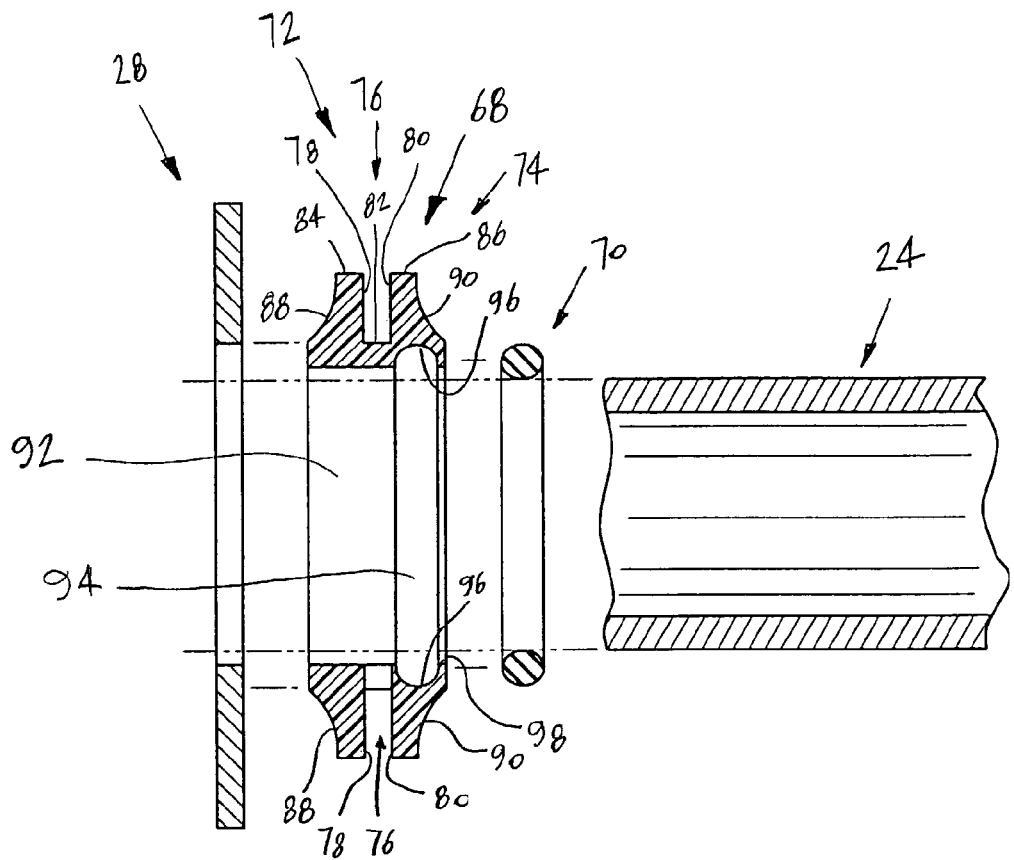
FIG. 5 is an exploded view of the sealing assembly of FIG. 4.

Referring now to FIGS. 4 and 5, the construction of one of the roller tube bearing/sealing sub-assemblies 34 is now described. The sub-assembly 34 comprises a bearing seal 68 and a sealing member or an O-ring 70. The bearing seal 68 may be constructed of any suitable plastic material such as polytetrafluoroethylene. The O-ring 70 may be formed from any rubber-like material such as silicone rubber. Each bearing seal 68 has a pair of annular rim sections 72 and 74 with an annular notch 76 positioned there between. The annular notch 76 has a pair of generally flat inwardly facing side walls 78 and 80 and an annular notch floor 82 that extends generally perpendicular to the side walls 78 and 80. Each annular rim section 72 and 74 has an annular outer surface 84 and 86, respectively, that extend generally perpendicular to the side walls 78 and 80, respectively. Further, each rim 72 and 74 has an outwardly facing tapered surface 88 and 90 which slopes inwardly from the outer surfaces 84 and 86, respectively.

The bearing seal 68 has a generally cylindrical bore 92 and a bore section 94. The bore section 94 has an annular semi-circular surface 96 that is sized and shaped to receive the outer curved surface of the O-ring 70. The bearing seal 68 further includes a cylindrical lip section 98 that is about the same diameter as the bore 92 and is used to help retain the O-ring 70 in place. In the installed position of FIG. 4, the tube 24 extends through the cylindrical bore 92 and through the O-ring 70. The inner surface of the O-ring 70 fits snugly against the outer surface of the tube 24 to thus provide a seal there against to resist the flow of juice, grease, and food particles from one side of the O-ring 70 to the other side thereof. Thus, the seal of the O-ring 70 helps to resist the flow of grease and the like through the bearing seal 68.

As can be appreciated, in operation of the roller grill assembly 20 one type of food product, such as hot dogs, can be placed on the roller tubes 24 located in cooking area 30 and a separate type of food product, e.g., corn dogs, egg rolls, hamburgers and sausages that have a tubular shape, food wrapped in tortillas, and tubular pastry rolls, can be placed on the roller tubes 24 located in the cooking area 32. This allows an operator to initially place the same type of food products, such as hot dogs, in the cooking area 30 and then remove them when cooked. Once the cooked hot dogs are removed, the operator can place additional uncooked hot dogs in the same cooking area 30. The divider ensemble 26 resists or prevents the flow of juices and particles from food cooked in cooking area 30 from flowing or moving along the tubes 24 into the other cooking area 32 and vice versa. The operator will thus be able to cook the hot dogs in the cooking area 30 without being concerned about the drippings or portions of the food in the cooking area 32 from contacting or being imparted upon the hot dogs to alter their flavor. Likewise, the divider ensemble 26 with its sealing sub-assemblies 34 and the partition wall 28 resists the flow of juice and particles from the hot dogs in the cooking area 30 along the surfaces of tubes 24 into the cooking area 32, so that the food flavor in the cooking area 32 is not altered thereby.

Therefore, an operator can cook two entirely different flavors of food in the separate cooking areas 30 and 32, while keeping the juices and particles of those foods from altering or modifying the flavor of each other. The divider ensemble 26 allows the operator to easily remember which cooking area is being used for the particular food product, and thus to prevent the operator from mistakenly placing one of the types of food products to be cooked on area 30 in area 32, and vice versa.

Figure 7:
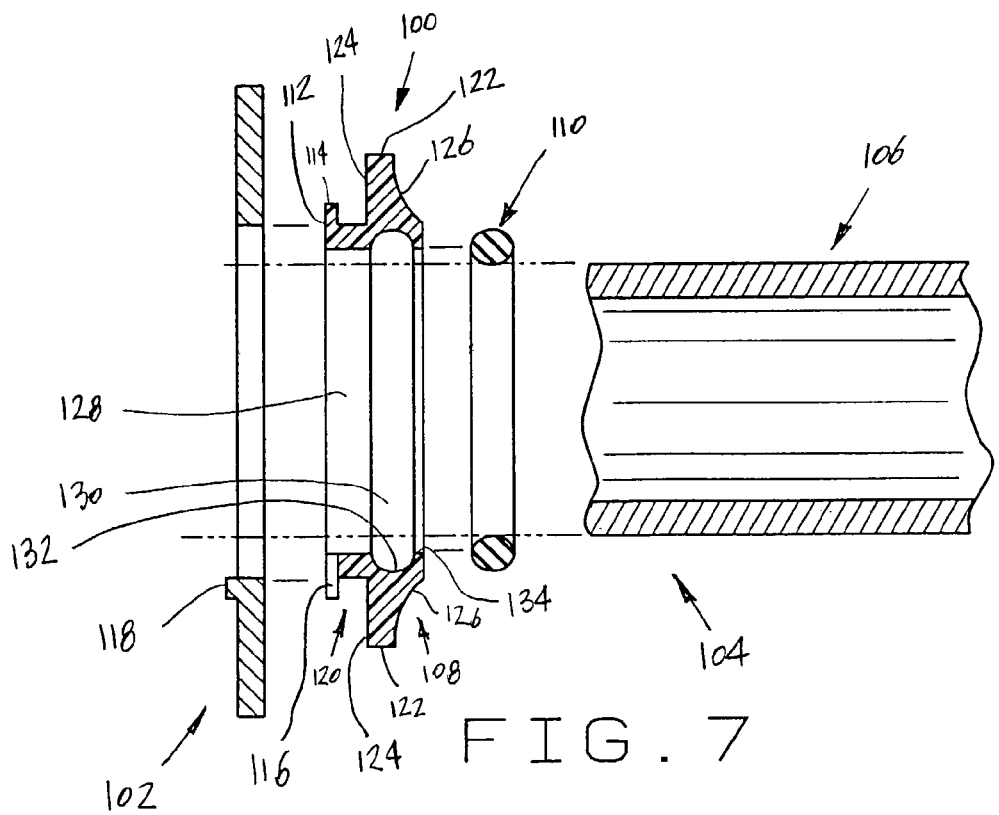
FIG. 7 is an exploded view of the sealing assembly of FIG. 5.

FIGS. 6 and 7 show an alternate embodiment of a sealing sub-assembly 100 to fit with a partition wall 102 of a divider ensemble 104. Each sealing sub-assembly 100 fits about a corresponding roller tube 106, such as shown in FIG. 6. As seen more clearly in the exploded view of FIG. 7, the alternate sub-assembly 100 comprises a bearing seal 108 and an O-ring 110. The bearing seal 108 can be of plastic, such as polytetrafluoroethylene, and the O-ring 110 can be of rubber-like material, such as silicon rubber. The bearing seal 108 has an outer cylindrical sleeve 112 that has an annular flange 114 with the flange 114 having a notch 116. The wall 102 has an integral nib 118 that projects outwardly from the wall surface 102. The notch 116 is sized to snugly receive the nib 118 to prevent rotation of the bearing seal 108 relative to the divider wall 102 when the tube 106 rotates.

The cylindrical sleeve 112 extends into an annular rim section 120, which has a flat annular outer surface 122, a substantially flat left side surface 124, and a curved tapered right side surface 126. The bearing seal 108 further has a cylindrical bore 128. The cylindrical bore 128 extends into a bore section 130 that has an arcuate semi-circular surface 132 shaped to receive the outer curved surface of the O-ring 110. The bore section 130 then extends into a bore lip section 134 which has about the same diameter as the cylindrical bore 128.

Figure 8:
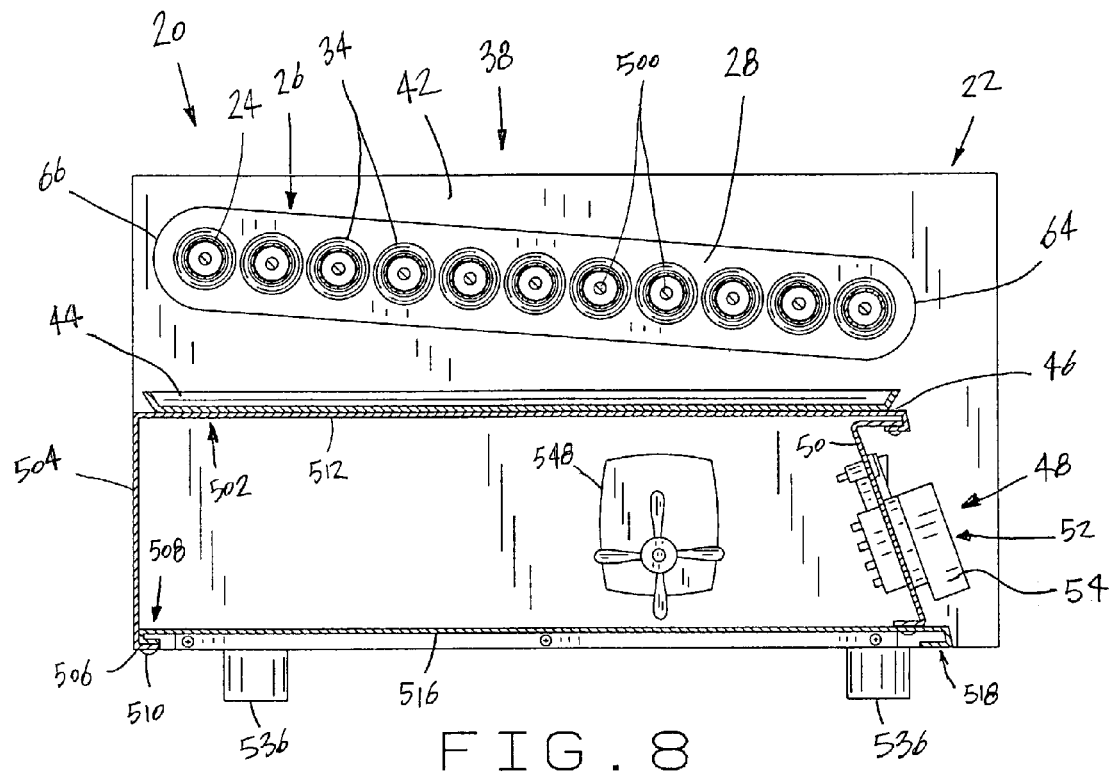
FIG. 8 is a section of the assembly taken on the line 8-8 of FIG. 3.

FIG. 8 illustrates a partial cross-sectional view of the roller grill assembly 20 taken along the plane of line 8-8 of FIG. 3. The roller grill assembly 20 comprises the main housing 22, upon which are mounted the plurality of rotatable tubular cooking members 24 which are adapted to being heated by heating elements 500. Further, the heating elements 500 can take the form of the heating elements shown and disclosed in U.S. Pat. No. 6,393,971. Although not shown in detail, the heating elements 500 can comprise a pair of elements within each of the cooking members with such members being individually controlled. One of the heating elements can extend into one end of a roller tube 24, while a second heating element extends into the other end of the same roller tube. The position to which each such element extends can be the same for each of the roller tubes 24 so that the section divider ensemble 26 can be placed at a location approximately between the distal ends of those heating elements. The temperature control knob 54 may control the heating elements in the cooking area 30 and the temperature control knob 56 may control the heating elements in the cooking area 32. The knobs 54 and 56 and the related circuitry can therefore control the two heating elements so that the temperature of one heating element differs from that of the other heating element. Hence, the temperature in the cooking area or section 30 can be at a different temperature than that in the cooking area or section 32, to suit the temperature needs for cooking two different kinds of food.

The assembly 20 further comprises the divider ensemble 26 comprising a divider partition wall member 28 for separating the cooking tubes 24 into the two cooking areas. The divider ensemble 26 also comprises roller tube bearing/sealing sub-assemblies 34 for providing a seal of the partition wall 28 about the tubes 24. The grease drip tray 44 is provided which rests on the floor section 46 beneath the roller tubes 24 to catch grease and fluids dripping there from. In the installed position, the lower edge of the divider partition wall 28 is spaced a sufficient clearance distance, preferably such as about 1¼ to 1¾ inches, above the drip tray 44. The lowest point of the divider wall 28 preferably has about 1½ to 2 inches clearance above the floor section 46. Such clearance allows drip tray 44 to be easily grasped and slid along the upper surface of the floor section 46 to be removed from the housing 22. The tray 44 can then be emptied and cleaned. The clearance beneath the roller tubes 24 allows the drip tray 44 to then be slid along the floor section 46 back into a position to capture grease and other droppings.

The housing 22 further comprises an integral L-shaped member 502, formed of rigid material, illustrated in this embodiment to be of stainless steel. The L-member 502 has a rear wall 504 which extends downward into a horizontal flanged foot 506 that is secured to the bottom of a base channel 508 by screws 510. The L-shaped housing member 502 further comprises a horizontal wall 512 that extends forward from the top of the rear wall 504. At the front of the horizontal wall 512 is an integral U-shaped channel 514. The housing also comprises a central horizontal base sheet 516 with the front end of the base sheet 516 extending into an integral U-shaped channel 518. The rear of the base sheet 516 extends into the base channel 508.

Figure 9:
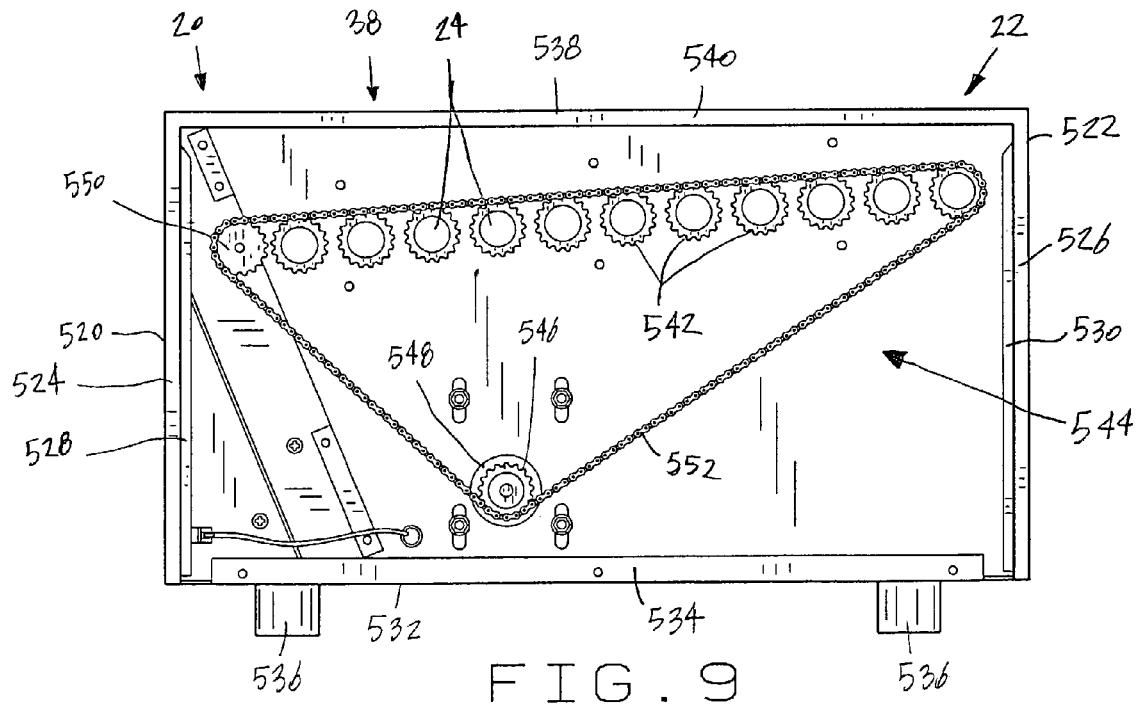
FIG. 9 is a side elevation of the left side of the assembly as viewed to the left of FIG. 1, with the geartrain cover and heating element connections removed.

Turning now to FIG. 9, the side frame 38 of the housing 22 is further shown to have a front facing frame wall 520 and a rear facing frame wall 522. The front frame wall 520 and the rear frame wall 522 each have projecting from their outer edges a channel 524 and 526, respectively, with inwardly extending lip flanges 528 and 530 projecting respectively from the channels 524 and 526 at their ends. A floor frame wall 532 has at its outer end an upwardly extending flange 534. The floor frame wall 532 may have feet 536 attached thereto. A frame top wall 538 has a vertical flange that depends there from.

The roller tubes 24 have cylindrical end sections at their left ends as viewed looking at FIGS. 1-3, while at their right ends, each of the roller tubes has formed integrally therewith a sprocket or gear 542 which is part of a roller tube drive assembly 544. The drive assembly 544 further comprises a driving sprocket 546 that is drivingly engaged with a shaft of a motor 548. The motor 548 is mounted by any known means in the housing 22. The drive assembly 544 further comprises an idler sprocket or gear 550 and a drive chain 552. The drive chain 552 extends from the drive sprocket 546 on to the idler sprocket 550 and thence to the tube sprockets 542. Further operation and construction of the drive assembly 544 is shown and described in the previously cited patent. Additionally, the manner in which the roller tubes 24 are heated and the circuitry employed for such heating is also described in such patent.

Figure 10:
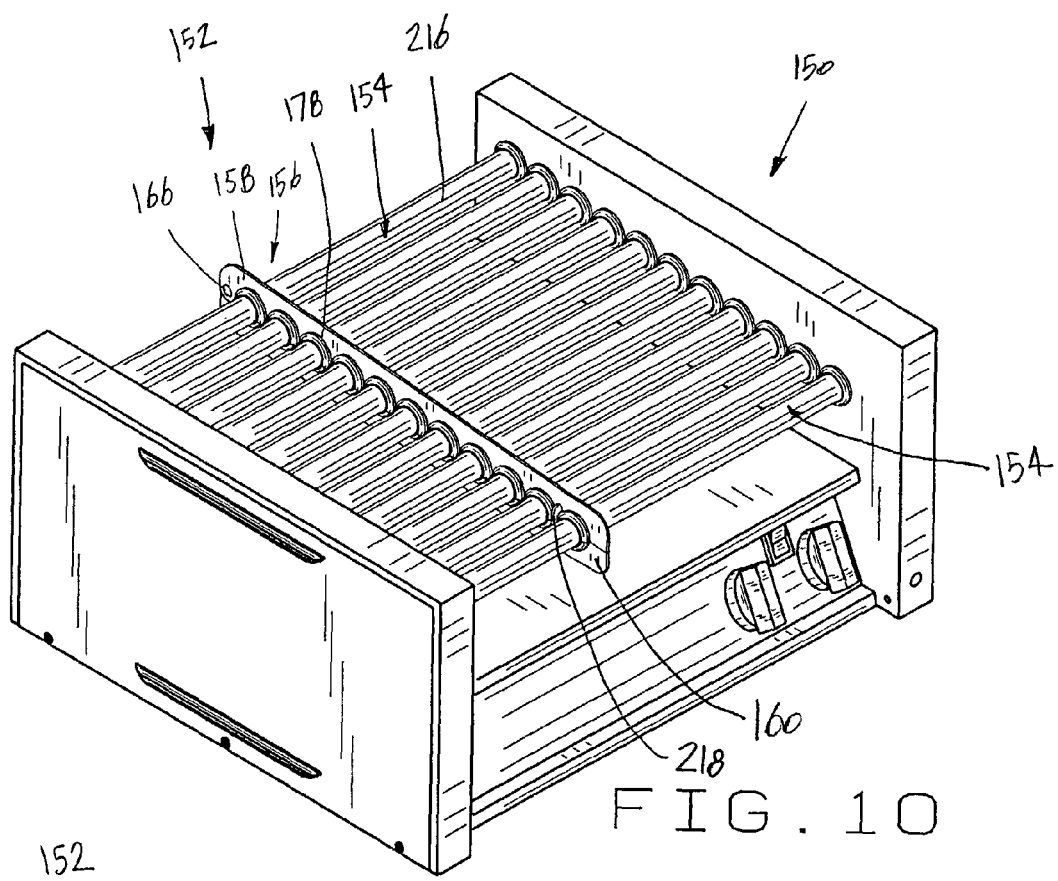
FIG. 10 is an orthogonal projection of a roller grill assembly having a modified section divider of the invention.
Figure 11:
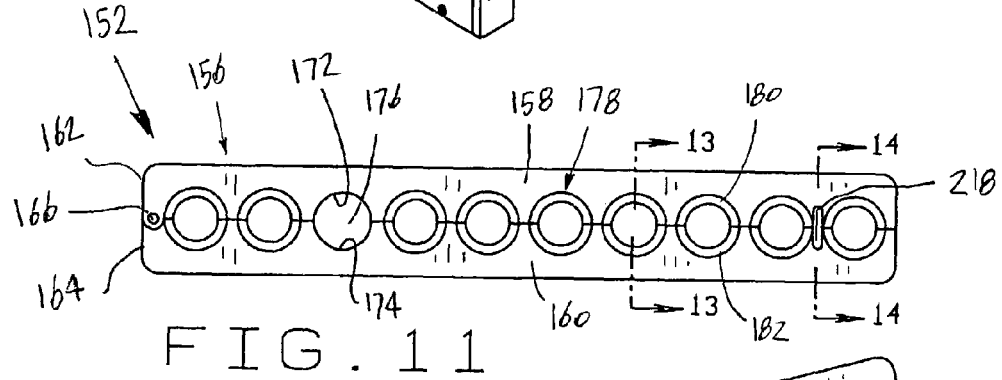
FIG. 11 is a side elevation of the alternate divider of FIG. 10, shown in the closed position with one of the bearing/sealing sub-assemblies shown removed.
Figure 12:
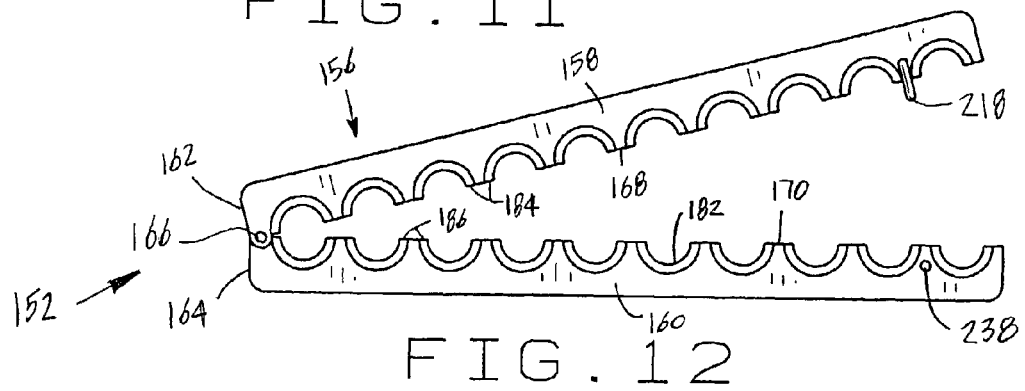
FIG. 12 is a side elevation of the modified divider of FIG. 10, shown in the open position.

Another embodiment of a roller grill for cooking human food having a section divider ensemble is depicted in FIGS. 10-14A. With particular reference to FIGS. 10-12, a roller grill assembly 150 has an ensemble 152 which is mounted to a plurality of roller tubes 154. The ensemble 152 has a divider partition wall 156 formed of an upper wall section 158 and a lower wall section 160. The wall sections 158 and 160 can be of stainless steel. At the left side of FIGS. 10-12, a pair of proximal ends 162 and 164 of the walls 158 and 160 is pivotally connected as by a rivet 166 that extends through aligned openings (not shown) in the walls 158 and 160. The rivet 166 allows the wall sections 158 and 160 to be pivoted away from one another to an open position, such as shown in FIG. 12. The wall sections 158 and 160 have inner edges 168 and 170, respectively. The edges 168 and 170 have formed therealong a plurality of semi-circular notches 172 and 174, respectively, as seen more clearly for the third opening from the left in FIG. 11. When the wall sections 158 and 160 are closed together as in FIG. 11, the inner edges 168 and 170 are in approximate contact, and the notches 172 and 174 are joined together so that a plurality of circular bores 176 extend along the partition wall 156. The ensemble 152 has a plurality of bearing seals 178 that fit with each of the pairs of semi-circular notches 172 and 174. Each bearing seal 178 comprises an upper semi-annular bearing section or upper bearing/sealing member 180 and a lower semi-annular bearing section or lower bearing/sealing member 182. The upper semi-annular sections 180 have a pair of flat edges 184 and the lower sections 182 have a pair of flat edges 186. The edges 184 are adapted to abut the flat edges 186 of the lower semi-annular section 182 when the ensemble 152 is in the closed position as is illustrated in FIG. 11.

With particular reference now to FIG. 13, each of the sections 180 and 182 have a semi-circular notch 188 and 190, respectively, that extends along the outside thereof to receive the edges of seri-circular notches 172 and 174 in the partition walls 158 and 160. The upper semi-annular section 180 and the lower semi-annular section 182 each have semi-circular passageways 192 and 194, respectively, that together form a closed opening 196 which can receive a tube 154. Each of the bearing sections 180 and 182 also has semi-annular sloped outer surfaces 198 and 200, respectively. The passageways 192 and 194 have central semi-cylindrical bores 202 and 204, respectively, that when joined together in the closed position of FIGS. 11 and 13, form a cylindrical bore section 206. The bore sections 202 and 204 further extend, as seen in FIG. 13, into a pair of bore sections 208 and 210, respectively. The bore sections 208 and 210 are tapered to have a smaller radius at their outer edge than at their inner edge so that the outer parts of the bearing sections 180 and 182 that extend thereabout have semi-annular tapered gripping lips 212 and 214, which together have an annular shape. When the partition wall sections 158 and 160 are closed about the tubes 154, the gripping lips 212 and 214 press against each outer surface 216 (FIG. 10) of the tubes 154 to prevent the passage of drippings and particles from food products being cooked on either side of the divider ensemble 152.

Referring again to FIGS. 10 and 11, a latch assembly 218 is employed to hold the two wall sections 156 and 160 together in the closed or locked position. With particular reference now to FIGS. 14 and 14A, the latch assembly 218 comprises a pair of latch tongs 220 and 222. As seen in FIG. 14, and in the isolated view of the tong 222 in FIG. 14A, each of the latch tongs 220 and 222 has a proximal section 224 and 226, respectively. Each of the proximal sections 224 and 226 has a flat inner surface (shown as 228 for the tong 222 in FIG. 14A) that fits substantially flush against the substantially flat outer surfaces of the divider wall sections 158 and 160 when the latch assembly 218 is in the closed position. The tong sections 220 and 222 can be secured or held in place by spot welding the tong sections 220 and 222 to the wall section 158. Each of the tongs 220 and 222 has a distal end 230 and 232, respectively, and each of the distal ends 230 and 232 has an inwardly projecting circular nib 234 and 236, respectively. The nibs 234 and 236 are adapted to fit snugly into a conforming circular bore 238 that is formed in the wall section 160 and is further depicted in FIG. 12. Each of the tongs 220 and 222 has a distal leg portion 240 and 242, respectively, which are positioned beneath each of the nibs 234 and 236. The distal leg portions 240 and 242 are adapted to abut or contact the wall section 160 when the two wall sections 158 and 160 are in the closed position. The nibs 234 and 236 further have outer edges 244 and 246, respectively, which are chamfered to facilitate opening or closing of the wall sections 158 and 160. For example, when the wall sections 158 and 160 are moved toward each other into the locked position, the chamfered surfaces 244 and 246 of the nibs 234 and 236 are wedged apart by the wall section 160. When the nibs 234 and 236 become aligned with the bore 238, the spring action of the tongs 220 and 222 moves the nibs 234 and 236 into a locked position within bore 238, as shown in FIG. 14, to hold the walls 158 and 160 together. To disengage the latch assembly 218, the leg portions 240 and 242 are pried away from the wall section 160 to move the nibs 234 and 236 away from one another. The wall sections 158 and 160 can then be pivoted away from each other so that the chamfered surfaces 244 and 246 of the nibs 234 and 236 assist or allow the nibs 234 and 236 to be disengaged from bore 238. In this manner, the ensemble 152 lends itself to easy installation with the assembly 150 without having to disengage the tubes 154 from the assembly 150.

As can be appreciated, for installation of the ensemble 152, the upper divider wall section 158 is pivoted away from the lower wall section 160 so that the section 160 can be slid beneath the tubes 154. Each of the lower bearing/seal members 182 is then aligned with a corresponding tube 154. The wall section 160 is then moved so that the corresponding tubes 154 are received within the bearing/seal members 182 with the bearing/sealing members 182 are pressed against the tube surfaces 216. The divider wall 158 is then pivoted downwardly until the bearing/seals 180' press against the tube surfaces 216 and the nibs 234 and 236 of latch tongs 220 and 222 are received in latching arrangement within the bore 238 of the lower wall 160. To disengage the ensemble 152, the latch 218 can be opened by pivoting the upper wall section 158 upwardly so that the lower wall section 160 can be removed from underneath the tubes 154.

Figure 15:
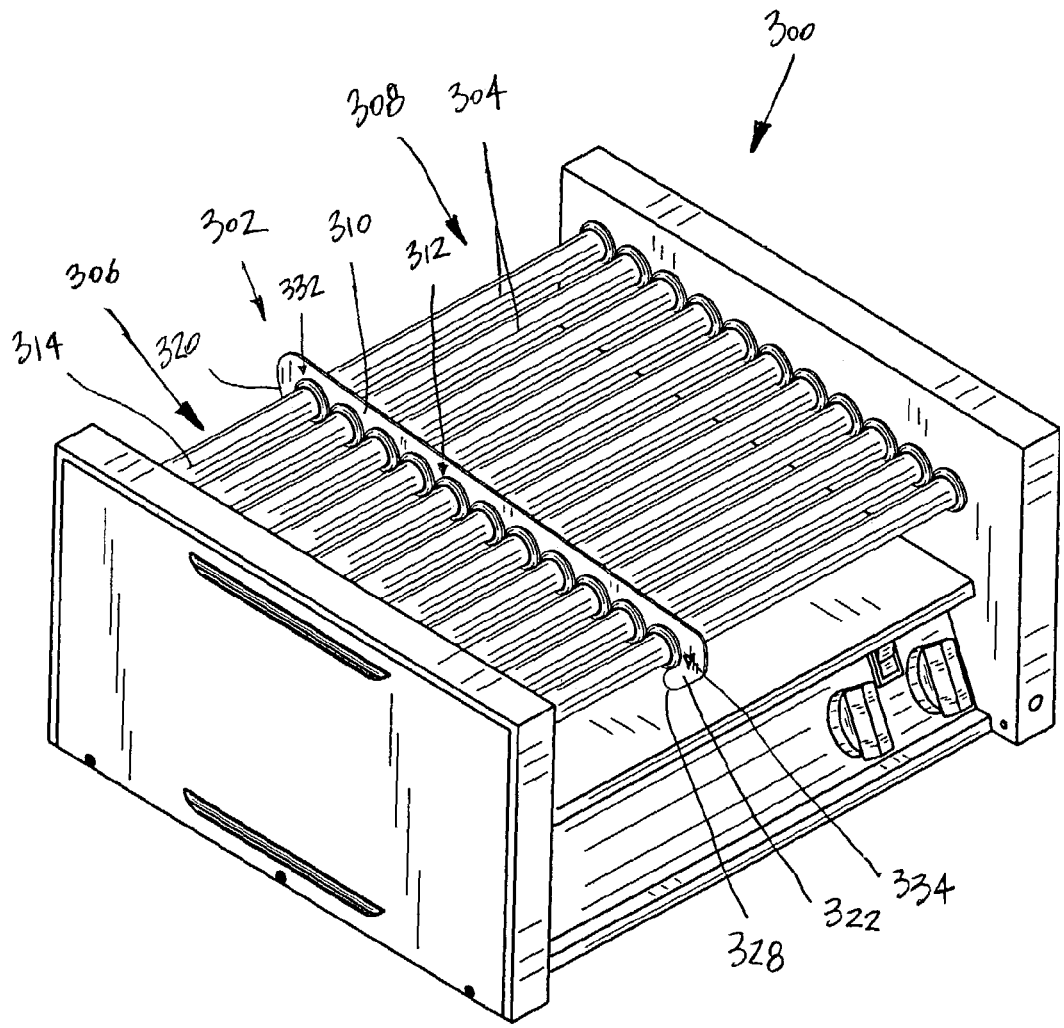
FIG. 15 is an orthogonal projection of a roller grill assembly having yet another modified divider of the invention.
Figure 16:
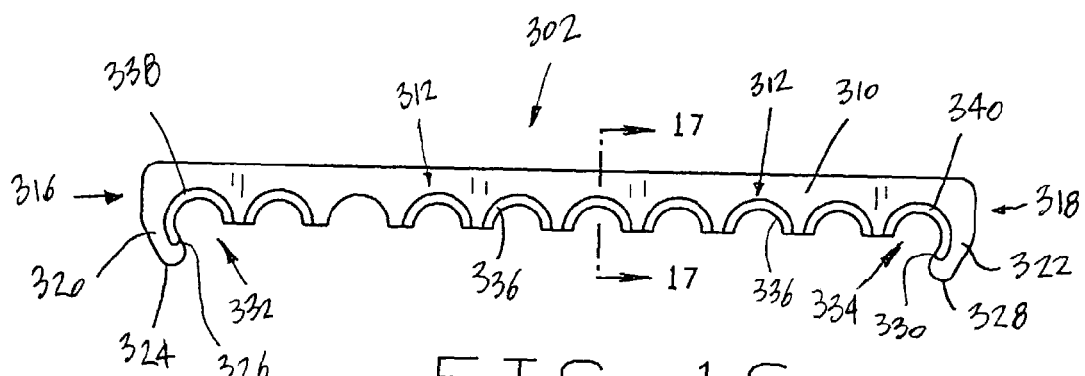
FIG. 16 is a side elevation of the divider of FIG. 15, with one of the bearing sub-assemblies shown removed.

Now attention is directed to another embodiment of a roller grill for cooking human food having a section divider ensemble that is illustrated in FIGS. 15-17. A roller grill assembly 300 is shown having a divider ensemble 302 mounted to a plurality of heated roller tubes 304. The ensemble 302 is used to divide the roller grill assembly 300 into two different cooking areas 306 and 308. In particular, the cooking area 306 may be used to cook food products having a particular length. The cooking area 308 may be used to cook food products having a different length than those of the food products being cooked in the cooking area 306. The ensemble 302 comprises a divider partition wall 310 having bearing sub-assemblies 312. The bearing sub-assemblies 312 are adapted to fit on cooking surfaces 314 of the roller tubes 304. In this particular embodiment, the ensemble 302 is described as being an integral piece of plastic, such as polytetrafluoroethylene, made such as by injection molding or other molding process.

Referring now in particular to FIG. 16, the partition wall 310 has a pair of opposite ends 316 and 318 each having an inwardly slanted leg 320 and 322, respectively. The leg 320 has a generally semi-circular end 324 having an inner edge 326. The other leg 322 also has a generally semi-circular end 328 and an inner edge 330. The ensemble 302 further comprises the bearing sub-assemblies 312 which are preferably unitary with the partition wall 310. The ensemble 302 further comprises two end bearing sub-assemblies 332 and 334 with the sub-assembly 332 being at the end 324 and the sub-assembly 334 being at the end 328. The bearing sub-assemblies 312 are positioned between the end sub-assemblies 332 and 334. The sub-assemblies 312 each comprise a bearing/seal 336. The end sub-assembly 332 has a bearing/seal 338 and the end sub-assembly 334 has a bearing/seal 340.

A sectional view of the bearing seal 336 of the sub-assembly 312 is shown in FIG. 17. The bearing seal 336 is preferably molded to be unitary or one piece with the partition wall 310. The bearing seal 336 has a semi-circular passageway 342 which can receive the roller tube 304. Each of the bearing/sealing members 336 has semi-annular sloped outer surfaces 344 and the passageway 342 has a central semi-cylindrical bore 346. The bore 346 extends outwardly into semi-circular bore sections 348. The bore sections 348 are tapered to be of smaller radius at their outer edge than at their inner edge where the bore sections 348 join the bore section 346. The bearing 336 further has semi-annular tapered gripping lips or flanges 350. When the ensemble 302 is placed about the tubes 304 the gripping lips 350 press against the outer surface 314 of the tubes 304 to prevent the passage of drippings and particles from food products cooked in the cooking areas 306 and 308 from passing from one side of the divider ensemble 302 to the other side.

The end bearing assembly 332 has the bearing/seal 338 which has the same cross-sectional configuration as the bearing members 312, except that the bearing/seal 338 has a curvature greater than a semi-circular shape, as can be seen in FIG. 16, to extend along the inside edge 326 of the leg 320. Further, the end bearing assembly 334 has the bearing/seal 340 constructed similar to the bearing/seal 338. The end bearing assembly 334 also extends along the inside edge 330 of the leg 322.

In installation, the ensemble 302 can be placed above the roller tubes 304 and then the ensemble 302 can then be tilted either so that its rear leg 320 or its forward leg 322 is lowered. For purposes of illustration, the installation of the ensemble 302 will be given assuming that the front leg 322 is being tilted down. The leg 322 can be moved to a position forward of the frontmost tube 304 of the assembly 300. The ensemble 302 can then be moved at an angle so that the forward most tube 304 is moved to be received within bearing/seal 340 so that its gripping flanges 350 rest against the forward most tube. The ensemble 302 can then be pivoted to lower the other leg 320 so that the other tubes 304 are received within the bearing/seals 336 with the rearmost tube 304 being received within bearing/seal 332 so that the gripping lips 350 of the bearing/seals 336 and 350 press against the tubes 304. This ensemble 302 lends itself to installation to assemblies 300 that are in the field, as it can be installed without having to disengage the roller tubes 304 from the assembly 300.

The ensemble can also be constructed with the bearing component being separate from the partition wall 310. This particular construction is illustrated in FIG. 17A. With reference now to FIG. 17A, a bearing/assembly or bearing member 360 has a semi-circular notch 362 to receive edges of semi-circular notches in a partition wall 364. The partition wall 364 in this embodiment would be constructed from stainless steel and the bearing member 360 would be constructed from any suitable plastic material such as polytetrafluoroethylene.

In FIG. 17A, the bearing/seal 360 likewise has a semi-circular passageway 366", semi-annular sloped outer surfaces 368, and a central semi-cylindrical bore 370 that extends outwardly into semi-circular bore sections 372. The bore sections 372 are likewise tapered to be of smaller radius at their outer edges than at their inner edges, and gripping lips 374 are provided at the openings of the bore sections 372. The lips 374 are capable of pressing against the outer tube surfaces, for example outer tube surfaces 314 of the roller tubes 304 of the assembly 300 to prevent passage of drippings and particles from food products.

Figure 18:
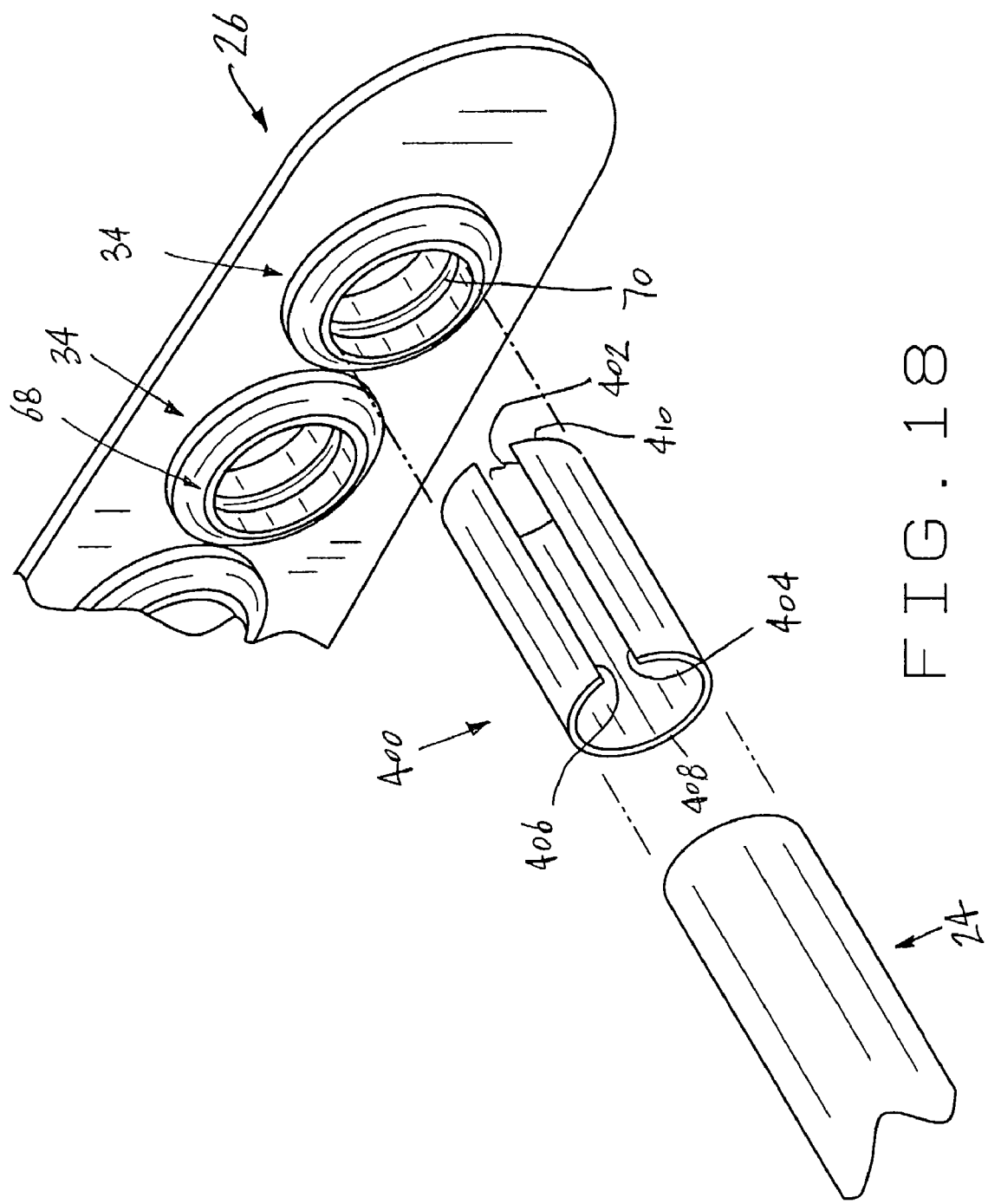
FIG. 18 is an exploded view showing a tool for mounting a roller tube with the divider.

FIG. 18 shows a tool 400 which may be used to mount the roller tube 24 to or through the ensemble 26. The tool 400 is elongated with an arcuate cross section and is illustrated having a generally cylindrical shape, with a slot 402 separating two longitudinal edges 404 and 406. The tool 400 has a first end 408, and a second end 410, both of which are of arcuate shape, and illustrated as generally being of a partially circular shape. The tool 400 can be constructed of spring steel.

For purposes of illustration in FIG. 18, a portion of the divider ensemble 26 is shown. The bearing sealing assembly 34, positioned at the front of the ensemble 26, is shown axially aligned with tool 400 with an O-ring 70 in place. Whereas, for purposes of illustration, the tool 400 is shown to the left of the divider ensemble 26, the tool 400 can be inserted through the bearing fitting 68 and the O-ring 70 from the right side of the divider ensemble 26 as well. The tool 400 can be compressed by the hand so as to pass through the O-ring 70 and the bearing 68, such as about ¼ to ½ inch past the bearing 68. The tool 400 can then be released by the hand so that it expands outwardly to stretch the O-ring 70 to press it firmly into its conforming bore section 96 (not shown in FIG. 18). In such position the tool 400 is in a compressed state and has a generally cylindrical shape and its ends 408 and 410 have a generally circular shape. With the tool 400 so positioned, the roller tube 24 can be inserted from the position in which it is shown in FIG. 18, to pass into the tool end 408. The tube 24 can continue to be inserted through the tool 400 and through bearing fitting 68 to extend about ½ inch beyond the inside of bearing fitting 68. The tube 24 could be inserted a lesser or farther distance if desired. After insertion to such point, the tool 400 can be grasped by the operator and slid away from the tube 24 and the ensemble 26 to thus become disengaged from the tube 24 and from the bearing 68 and the O-ring 70. The tube 24 is thus positioned to continue pressing the O-ring 70 outwardly into its conforming bearing bore 96. The roller tube 24 can thence be moved through the bearing fitting 68 and the O-ring 70 until the divider ensemble 26 is located in the desired position relative to the tube 24 to provide for the desired amount of space for cooking areas 30 and 32. The process or method can then be repeated for inserting the tool 400 through the bearing fittings 68 and the O-rings 70 in the remaining sealing assemblies 34 to give the desired amount of space for the cooking areas 30 and 32.

Figure 19:
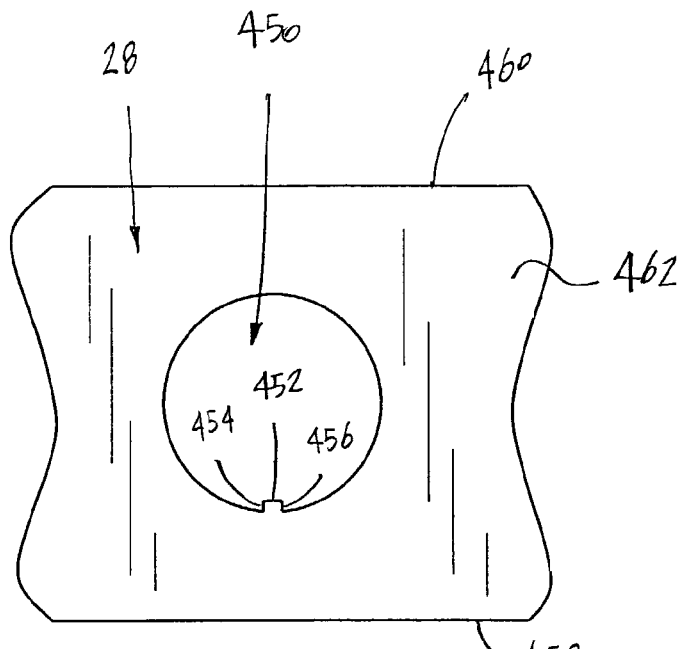
FIG. 19 is a broken side elevation of the divider of FIG. 1.

Referring now to FIG. 19, a partial view of the divider partition wall member 28 is depicted to illustrate the construction thereof. In particular, the wall 28 has a plurality of circular openings 450, of which only one is illustrated, sized to allow a corresponding roller tube 24 to extend there through. Each opening 450 has at its lower edge a tab 452 that projects radially inwardly. The tab 452 is integral with the partition wall member 28. The tab 452 also has a radially extending left wall 454 and a radially extending right end wall 456. The partition wall 28 has a lower edge 458 and an upper edge 460 which are preferably approximately straight and parallel with each other. The edges 458 and 460 extend into the lower and upper edges of the curved ends 64 and 66, shown in FIGS. 1 and 3, respectively. The partition 28 also has a pair of side surfaces 462, of which only one such surface 462 is shown in FIG. 19. The roller tube sealing sub-assemblies 34 fit with the partition 28 and are adapted to mate with the tab 452, as will be described herein.

Figure 20:
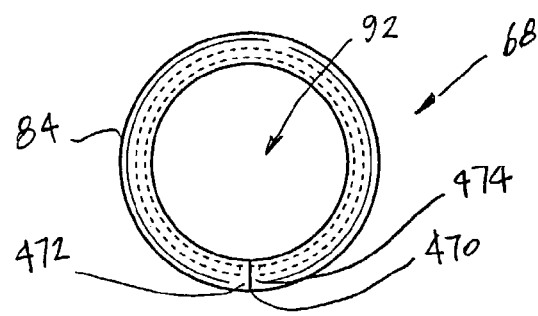
FIG. 20 is a side elevation of an isolated bearing/sealing subassembly of FIGS. 4 and 5.
Figure 21:
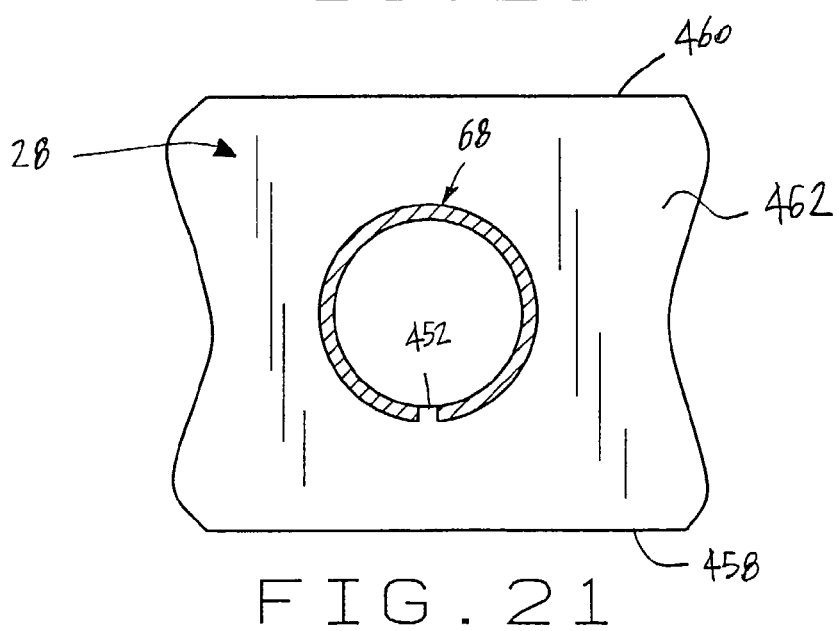
FIG. 21 is a broken side view of the divider of FIG. 1 showing a section of an installed bearing/sealing subassembly.

With reference now to FIG. 20, a side view of a bearing 68 is depicted. The bearing 68 has a radial slit 470 that separates the bearing 68. The slit 470 extends from the bearing outer edges 84 and 86 (not shown) to the bore 92. The slit 470 separates the bearing 68 so that it has first and second ends 472 and 474, which can be pulled apart or away from each other when the bearing 68 is in the isolated position of FIG. 20. The ends 472 and 474 of the slit 470 may be pulled part far enough to fit or mate with the tab 452. FIG. 21 illustrates the bearing 68 fitted within the opening 450 of the wall 28.

To install the bearing seal 68 with the partition 28, the bearing seal 68, in its isolated position of FIG. 20, is grasped and the ends 472 and 474 are pulled apart. The bearing seal 68 is inserted into the circular opening 450 and the ends 472 and 474 contact or abut the tab 452. Once the bearing seal 68 is installed, the O-ring 70 can then be installed within bearing 638. With the bearing seal 68 mounted in the partition wall 28, the annular wall opening 450 of the wall 28 fits approximately flush against the annular surface of the bearing seal 68. The radially extending left wall 454 and the radially extending right end wall 456 engage the bearing 68 to resist rotation of the bearing 68 relative to the partition wall 28 regardless of the direction of rotation of the tube 24. The anti-rotation action of the tab 452 in conjunction with the ends 472 and 474 of the bearing 68 help to resist wear and tear of the bearing 68.

As can be appreciated from the foregoing, although one divider ensemble 26, 152, or 302 has been discussed that divides the assembly 20, 150, or 300 into two cooking areas, it should be recognized and understood that an additional divider ensemble can also be placed about the roller tubes 24 in the same fashion as shown and spaced from the other divider ensemble so as to divide the assembly into three separate cooking areas. Further, additional ensembles could be used to divide the cooking area into a larger number of sections, for example, four or more cooking areas. It is also contemplated and possible that the cooking areas 30 and 32 may be sectioned into equal areas or that one cooking area will be larger than the other cooking area. As can be further appreciated, the divider ensembles 26, 152, and 302 can be easily moved, installed, or repositioned on the tubular cooking members. It is also possible and contemplated that the divider ensembles 26, 152, and 302 may be used on the same roller grill assembly.

Although the series of roller tubes 24 are shown mounted at an angle relative to the housing 22 it should be understood that the roller tubes 24 may also be aligned parallel to each other and on a horizontal plane or with roller tubes 24 that angle downwardly from the front to the rear of the housing 22 and the ensembles 26 or 152, or 302 can be used equally well with such orientations of the roller tubes 24. In either case, there preferably are at least about 1¼ to 1¾ inches of clearance between the lowest point of the divider wall 28 and the uppermost point of the grease tray 44.

From all that has been said, it will be clear that there has been shown and described herein a roller grill for cooking human food with section divider ensemble which fulfills the various objects and advantages sought therefore. It will be apparent to those skilled in the art, however, that many changes, modifications, variations, and other uses and applications of the subject roller grill for cooking human food with section divider ensemble are possible and contemplated. All changes, modifications, variations, and other uses and applications which do not depart from the spirit and scope of the invention are deemed to be covered by the invention, which is limited only by the claims which follow.

What is claimed is:

1. A roller grill for cooking human food comprising:
 a housing having a plurality of tubular cooking members rotatably mounted within the housing;
 a divider ensemble shaped to be positioned on and supported solely by the tubular cooking members for sectioning the tubular cooking members into a first cooking area and a second cooking area;
 wherein the divider ensemble comprises a wall member having a plurality of openings with each of the openings having a bearing assembly shaped to receive one of the tubular cooking members.

2. The roller grill of claim 1 wherein the bearing assembly comprises a bearing member and a sealing member.

3. The roller grill of claim 2 wherein the bearing member comprises a pair of annular rim sections with an annular notch positioned therebetween, each of the annular rim sections having an outer surface, a cylindrical bore, and a bore section with the bore section shaped to receive the sealing member.

4. The roller grill of claim 1 wherein the divider ensemble comprises a divider partition wall having a pair of opposite ends with each end having an inwardly slanted leg, a plurality of bearing sub-assemblies, and a pair of end sub-assemblies.

5. The roller grill of claim 4 wherein each of the bearing sub-assemblies comprises a bearing seal and the pair of end bearing sub-assemblies comprises a bearing seal.

6. The roller grill of claim 4 wherein the bearing sub-assemblies are integral with the divider partition wall.

7. The roller grill of claim 4 wherein the bearing sub-assemblies and the divider partition wall are a unitary construction.

8. The roller grill of claim 4 wherein the bearing sub-assemblies each have a semi-annular tapered gripping lip.

9. A roller grill for cooking human food comprising:
 a housing having a plurality of tubular cooking members rotatably mounted within the housing; and
 a divider ensemble shaped to be positioned on the tubular cooking members for sectioning the tubular cooking members into a first cooking area and a second cooking area; and wherein the divider ensemble comprises an upper wall section and a lower wall section movably connected to each other, each of the wall sections having a plurality of semi-circular notches, and each of the notches having a bearing seal shaped to be received by the notch.

10. The roller grill of claim 9 wherein each of the bearing seals comprises a semi-annular bearing section.

11. The roller grill of claim 9 further comprising a latch assembly to hold the upper and lower wall sections in a closed position.

12. The roller grill of claim 9 wherein each of the bearing seals comprises a semi-annular tapered gripping lip.

13. A roller grill for cooking human food comprising:
a housing having a plurality of tubular cooking members rotatably mounted within the housing; and
a divider ensemble shaped to be positioned on the tubular cooking members for sectioning the tubular cooking members into a first cooking area and a second cooking area; and
wherein the divider ensemble comprises an upper wall section and a lower wall section pivotally connected to each other, each of the wall sections having a plurality of semi-circular notches, and each of the notches having a bearing seal shaped to be received by the notch.

14. A divider ensemble for a roller grill assembly for cooking a first food product having a first length and a second food product having a second length, the roller grill assembly comprising a plurality of rotatable tubular cooking members, the divider ensemble comprising:
a wall member having a plurality of openings with each of the openings having a bearing assembly shaped to receive one of the tubular cooking members, the wall member for sectioning the tubular cooking members into a first cooking area and a second cooking area.

15. The divider ensemble of claim 14 wherein the bearing assembly comprises a bearing member and a sealing member.

16. A divider ensemble for a roller grill assembly for cooking human food, the roller grill assembly having a plurality of rotatable tubular cooking members, the divider ensemble comprising:
an upper wall section and a lower wall section movably connected to each other, each of the wall sections having a plurality of semi-circular notches, and each of the notches having a bearing seal shaped to be received by the notch; and
a latch assembly for holding the wall sections in a closed position.

17. The divider ensemble of claim 16 wherein each of the bearing seals comprises a semi-annular tapered gripping lip.

18. The divider ensemble of claim 16 wherein each of the wall sections have first and second ends, and the wall sections are pivotally connected to each other near their ends.

19. The divider ensemble of claim 18 further comprising each wall section having an opening near one of its ends, with the openings being aligned with each other, and a member for extending through the aligned openings for pivotal connection.

20. The divider ensemble of claim 16 wherein the upper wall section and the lower wall section each have a conforming bore and the latch assembly comprises a pair of tong sections with each of the sections having a distal end and each of the distal ends having an inwardly projecting circular nib with the nibs shaped to fit snugly into the conforming bores.

21. A divider ensemble for a roller grill assembly for cooking food, the roller grill assembly having a plurality of rotatable tubular cooking members, the divider ensemble comprising:
a divider partition wall having a pair of opposite ends, a plurality of bearing sub-assemblies for receiving and sealing about corresponding roller tubes, and a pair of end sub-assemblies for receiving and sealing about corresponding roller tubes.

22. The divider ensemble of claim 21 wherein each of the plurality of bearing sub-assemblies comprises a bearing seal and the pair of end bearing sub-assemblies comprises a bearing seal.

23. The divider ensemble of claim 22 wherein the bearing seals are integral with the divider partition wall.

24. The divider ensemble of claim 22 wherein the bearing seals and the divider partition wall are a unitary construction.

25. The divider ensemble of claim 22 wherein the bearing seals each have a semi-annular tapered gripping lip.

26. A roller grill for cooking human food comprising:
a housing having a plurality of tubular cooking members rotatably mounted within the housing; and
a divider ensemble shaped to be positioned on the tubular cooking members for sectioning the tubular cooking members into a first cooking area and a second cooking area; and
wherein the divider ensemble comprises a wall member having a plurality of openings with each of the openings having a bearing assembly shaped to receive one of the tubular cooking members.

* * * * *